United States Patent [19]

McFatter

[11] 4,074,847
[45] Feb. 21, 1978

[54] WELDED STORAGE TANK CONSTRUCTION INCLUDING A STRUCTURAL FIN

[75] Inventor: Myron L. McFatter, League City, Tex.

[73] Assignee: Anchortank, Inc., Seabrook, Tex.

[21] Appl. No.: 725,114

[22] Filed: Sept. 20, 1976

[51] Int. Cl.² .............................................. B23K 31/02
[52] U.S. Cl. ................................. 228/145; 228/17.7; 228/173 D; 228/184
[58] Field of Search ................... 228/145, 17.7, 173 D, 228/184

[56] References Cited

U.S. PATENT DOCUMENTS

| 2,233,233 | 2/1941 | Williams | 219/62 |
| 3,380,147 | 4/1968 | McDonald | 228/145 |

Primary Examiner—Donald G. Kelly
Assistant Examiner—K. J. Ramsey
Attorney, Agent, or Firm—Cooper, Dunham, Clark, Griffin & Moran

[57] ABSTRACT

Method and apparatus for producing a large diameter storage tank from strip metal. The strip is fed to a support assembly arranged circularly on a base and which supports the strip vertically in a helical path. The upper edge of the strip is bent into a right-angled bend which is aligned with the unbent lower edge of the helical turn immediately thereabove. The two aligned edges are welded together. The right-angled bend produces a helical outwardly extending structural fin on the outside of the storage tank.

4 Claims, 8 Drawing Figures

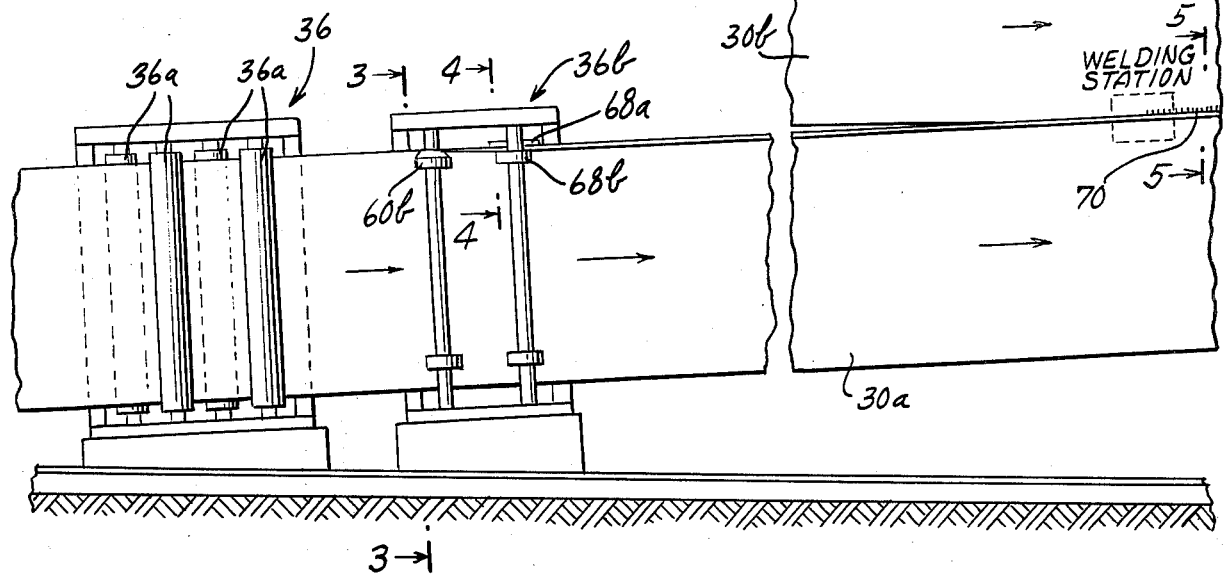
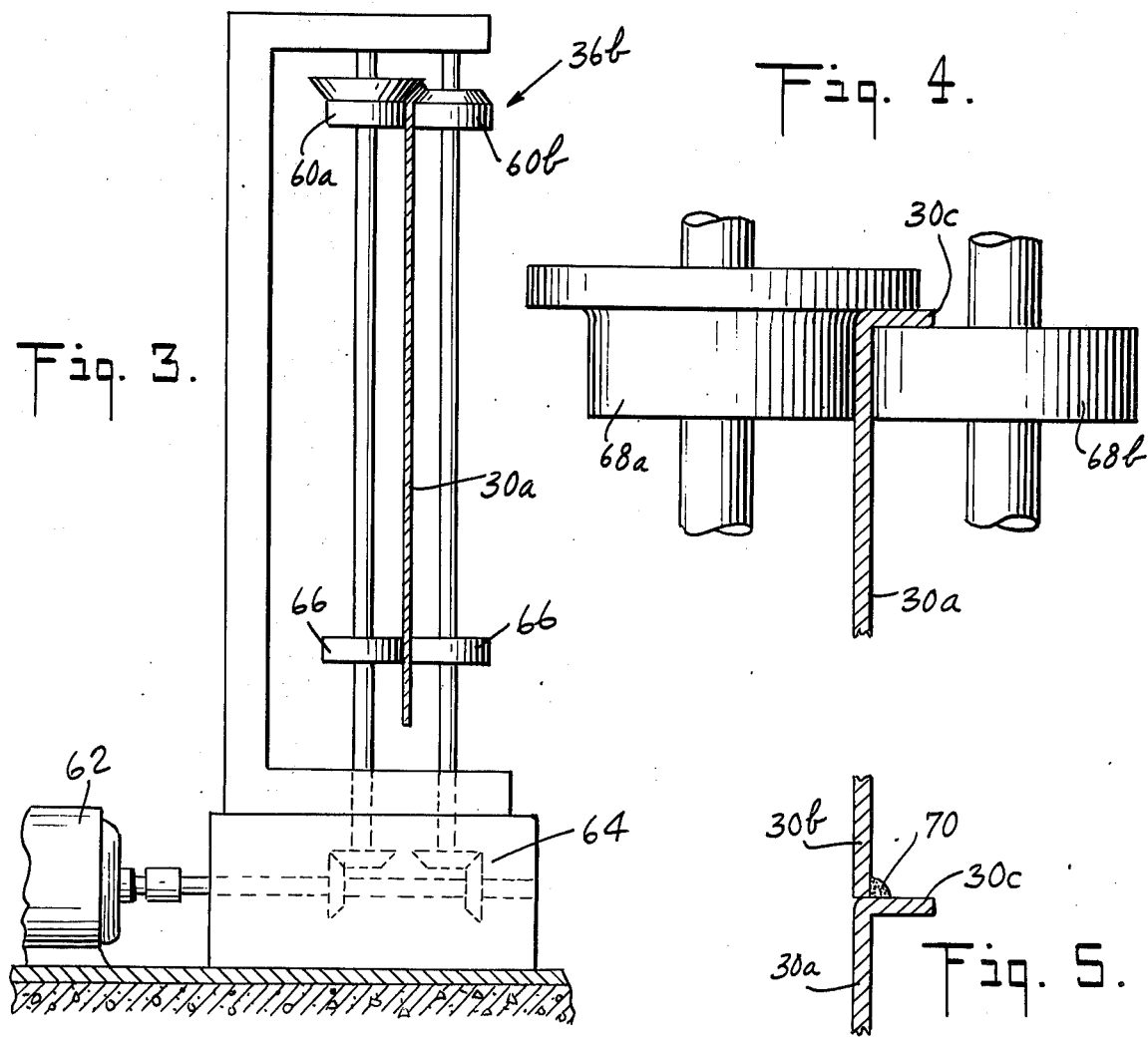

WELDED STORAGE TANK CONSTRUCTION INCLUDING A STRUCTURAL FIN

BACKGROUND AND BRIEF DESCRIPTION OF THE INVENTION

This invention relates to method and apparatus for producing large diameter storage tanks from strip metal. The invention is particularly directed to the production of such storage tanks in simplified fashion utilizing a combination of plate bending and welding.

It is known to produce large diameter storage tanks from strip metal, in which the strip is fed to a support assembly arranged circularly on a base for supporting the strip vertically in a helical path. McDonald U.S. Pat. No. 3,380,147 issued Apr. 30, 1968 discloses such a technique in which the strip is bent and welded. The bending of the strip, as disclosed in that patent, is a crimping of the top edge of the strip to provide an offset section so that the lower edge of the helical turn thereabove will fit into that offset section as it is fed over the top of the incoming strip of sheet steel. Double welding, both on the inside and outside of the tank, is required to secure adjacent helical turns of strip together.

It has also been proposed by others to bend both the top and bottom edges of strip steel in building a storage tank so that the adjacent edges of helical turns may be interfitted together and thereafter welded, as desired. While this construction produces a desirable outwardly extending helical fin on the storage tank, it does require the bending of both upper and lower edges of the strip steel and their interfitting together.

In the present application, only the upper edge of the strip is bent to substantially a right-angled bend, the bent upper edge is aligned with the unbent lower edge of the helical turn immediately thereabove, and the two aligned edges are welded together to produce a large diameter storage tank with a helical fin thereon constituted by the single right-angled bend in the strip.

The invention will be more completely understood by reference to the following detailed description, taken in conjunction with the appended drawing.

BRIEF DESCRIPTION OF THE DRAWING

FIGS. 2 and 6 are detailed views, to enlarged scales, of parts of the system shown in FIG. 1, looking in the direction of arrows 2 and 6.

FIGS. 3 to 5 are detailed views, to enlarged scales, of parts of the system shown in FIG. 2, looking in the direction of arrows 3, 4, and 5.

DETAILED DESCRIPTION

Figure 1:
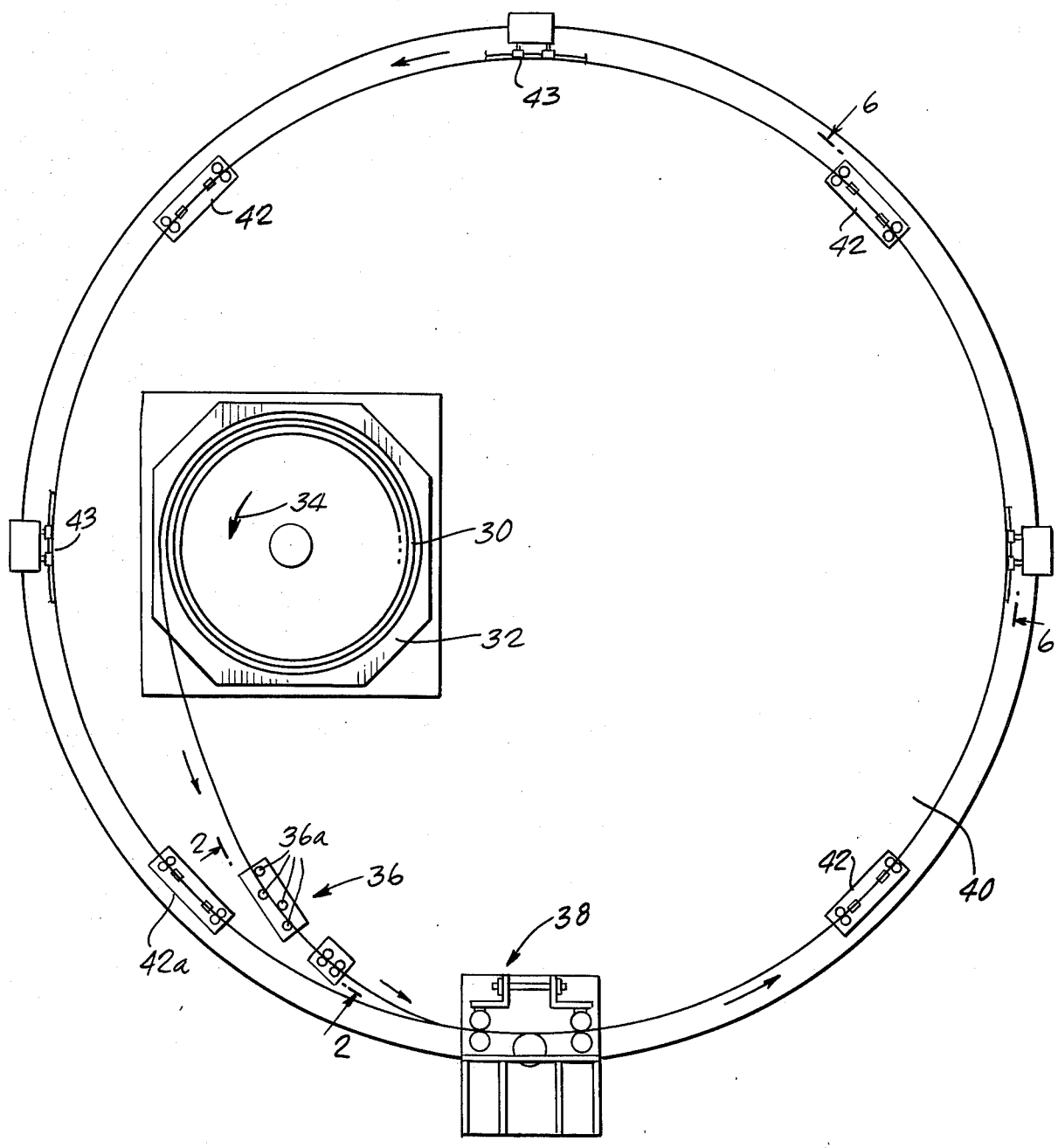
FIG. 1 is a plan view of a system for producing a storage tank in accordance with the invention.

Referring to FIG. 1, coiled strip 30, typically strip steel, is mounted on a support platform 32 which is free to rotate in the direction of arrow 34. The free end of the strip is led through a bending roller assembly 36 which is shown in more detail in FIG. 2 and which bends the upper edge of the strip into substantially a right-angled bend. The strip then passes through an assembly 38 for supporting and welding the strip, as explained in more detail below. The strip proceeds onto a support assembly arranged circularly on a base 40. The support assembly comprises groups 42 of support rollers spaced preferably equidistantly (although not necessarily) in circular fashion about the base 40 along with strip drive mechanisms 43. The support and drive roller structures 42 and 43 are shown in more detail in FIG. 6, and are included for the purpose of supporting and driving the strip at a predetermined pitch or incline from the horizontal so that the strip may follow a helical path in the building of a storage tank. The free end of the strip passes from the last one of the support roller assemblies designated 42a in FIG. 1 and again through the assembly 38. Within the assembly 38, the bent upper edge of the strip that is fed to the support assembly from the bending assembly 36 is aligned with the lower edge of the helical turn immediately thereabove (that portion of the strip coming from the last support roller assembly 42a). These strip edges are welded together in the assembly 38 as will be described in more detail below.

Figure 6:
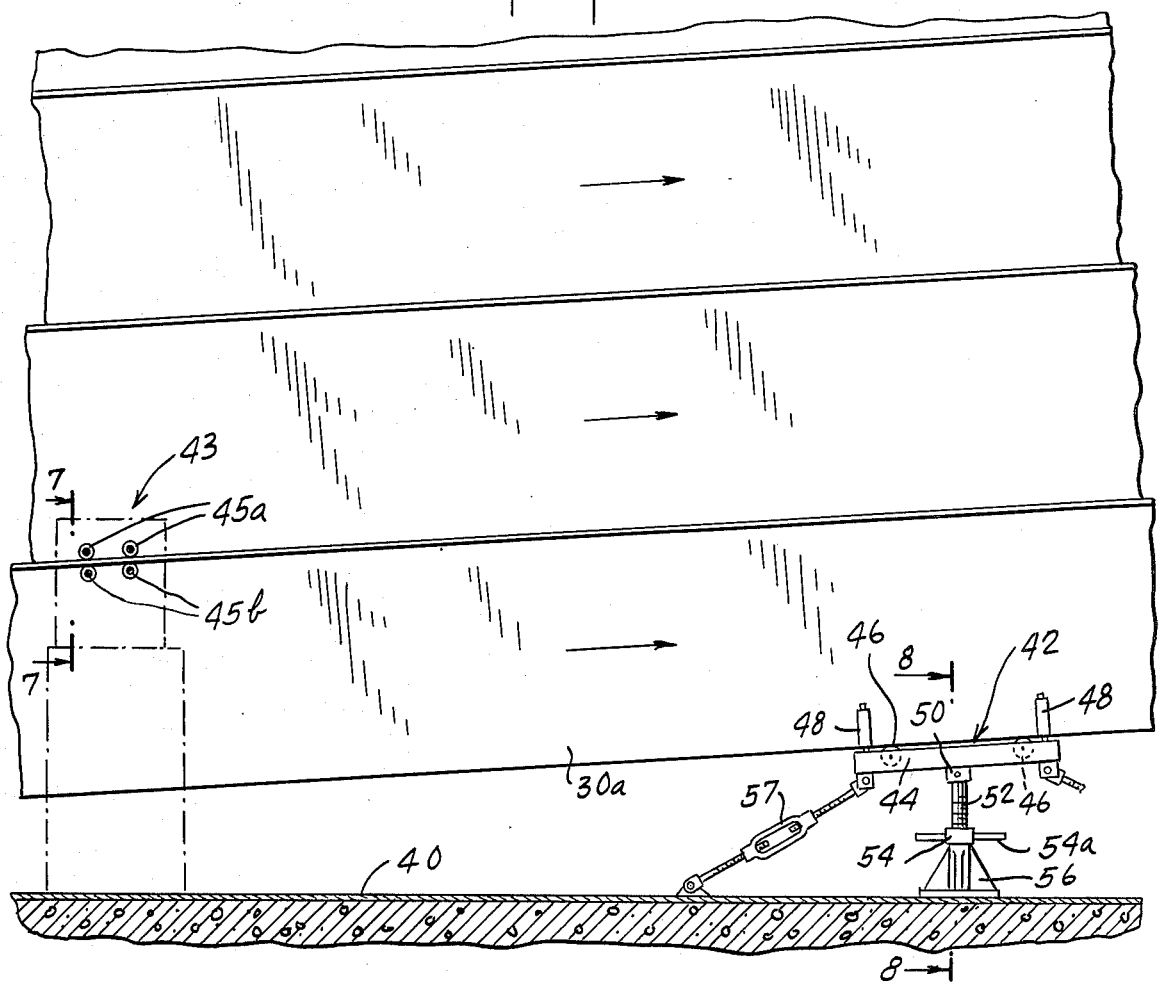
Figure 8:
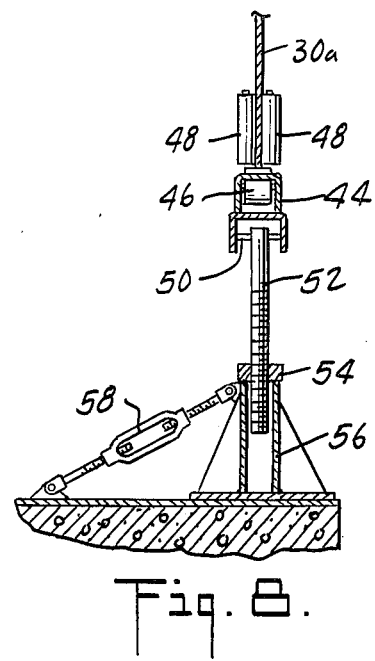

Referring to FIGS. 6 and 8 together, one of the support assemblies 42 for supporting the strip about the base is shown. A roller support bracket 44 carries support rollers 46 which support the lower edge of strip 30a. The support bracket 44 also carries side support rollers 48 positioned against the inside and outside surfaces of the strip 30a. These support rollers provide appropriate support of the strip 30a.

The support bracket 44 is pivotally mounted about a horizontal axis provided by pin 50 which passes through a threaded rod 52. That rod is threaded through a cap 54 which rotates freely upon base structure 56. The support bracket 44 is thus essentially pivotable about a vertical axis (the axis of the threaded rod 52. As shown in FIG. 6, the threaded cap 54 includes a handle 54a secured thereto to permit the selective turning of the cap 54 and the consequent raising and lowering of the threaded rod 52. Thus the support bracket 44 is vertically adjustable to vary the height of that bracket above the base 40 of the entire tank building facility. When the bracket 44 and the cap 54 are pivoted together, no height change is effected; however, the orientation of the bracket 44 about the vertical axis referred to above is changed. In this fashion the roller support bracket 44 may be shifted in its orientation about the vertical axis to accommodate tanks of varying diameters (the roller support structure 42 would obviously be moved inwardly or outwardly on the base 40 in the building of tanks of different diameters).

The horizontal orientation of the roller support bracket 44 is fixed by virtue of turnbuckle assemblies 57 joining the ends of the bracket 44 to the base 40. As the ends of the support bracket 44 are lowered and raised, the inclination of that support bracket with respect to the horizontal is changed, thereby to accommodate varying pitches of strip metal in the building of tanks of different diameters or different widths of strip metal. The adjustable turnbuckle arrangement 57 is adjusted for the particular orientation of the roller support bracket 44. In this regard, it will be noted that the roller support bracket automatically assumes the appropriate orientation for a particular pitch of strip metal by the pivoting of the bracket about the pivot pin 50.

The support structure 56 shown in FIGS. 6 and 8 that supports the threaded rod 52 may be anchored to the base 40 in any suitable fashion. That structure may be bolted or welded to the base, if desired, and a supporting turnbuckle assembly 58 (FIG. 8) may be utilized to prevent tipping of the support structure 56.

Figure 7:
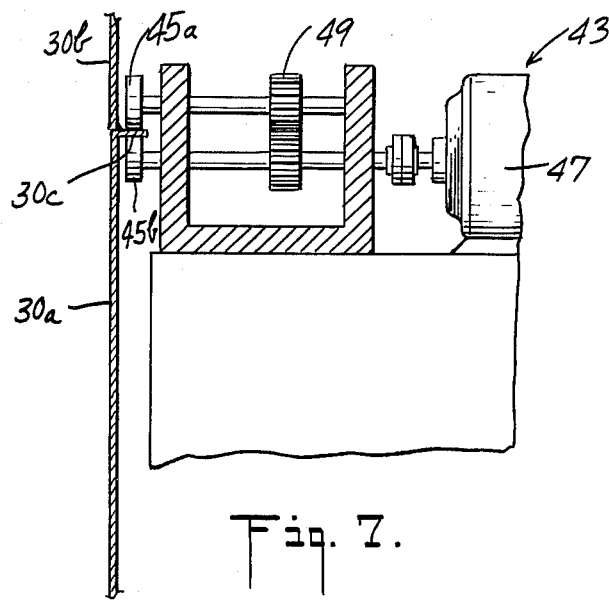
FIGS. 7 and 8 are detailed views, to enlarged scales, of parts of the system shown in FIG. 6, looking in the direction of arrows 7 and 8.

Interspersed among the support structures 42 are strip drive mechanisms 43. There may be three of such strip drive mechanisms which, together with a strip driving mechanism forming part of the assembly 38, are also spaced about 90° about the circumference of the tank building facility. A presently preferred form of drive assembly 43 is shown in FIG. 7. The bent upper edge 30c of the strip 30a is shown pinched between rollers 45a and 45b which are driven by a motor 47 through gearing 49.

Referring to FIGS. 2 and 4, the station 36 for bending the strip metal is shown. As noted above in the description of FIG. 1, the station 36 receives the strip 30a from the coil 30. The station 36 includes conventional bending rollers 36a for appropriately bending the strip to provide it with either no curvature or a predetermined degree of curvature to aid in the construction of the tank. The strip passes from the bending rollers 36a to a further bending assembly 36b shown in detail in FIGS. 3 and 4. Referring to FIG. 3, the strip 30a is first bent at the upper edge thereof by bending rollers 60a and 60b into approximately a 45° angle. The bending rollers 60a and 60b are driven by a motor 62 acting through gearing 64. Support and drive rollers 66 may also be included, driven by the motor 62, to aid in movement of the strip 30a through the bending assembly.

After being bent into approximately a 45° angle bend, the upper edge of the strip 30a is acted upon by further bending rollers 68a and 68b, shown in FIG. 4, which also may be driven by the motor 62. The upper edge of the strip 30a is thus bent into substantially a right-angled bend 30c.

From the bending assembly 36b, the strip 30a passes to the assembly 38 shown in FIG. 1. This assembly essentially constitutes a plate alignment, plate welding, and plate driving station of the type disclosed in co-pending application Ser. No. 656,252 filed Feb. 9, 1976 by the inventor of the present application and entitled "Storage Tank Construction Procedures". The entire disclosure of that co-pending application is hereby expressly incorporated herein. In the assembly 38, the strip 30a, and specifically the bent upper edge 30c thereof, is aligned with the lower edge of strip 30b constituting the helical turn immediately above the strip 30a. The alignment is simplified since the unbent lower edge of the turn 30b simply rests upon the bent upper edge of the turn 30a. The alignment of these two adjacent turns is shown in FIG. 5, and the edges of the strip turns are welded together in the station 38, as shown by weld bead 70. It will be noted that the vertical portions of the strip turns 30a and 30b are in vertical alignment.

The right-angled bend 30c in the strip produces a fin which extends outwardly from the storage tank. This fin is a helical fin that runs along the entire outside surface of the tank along a helical path from the bottom to the top of the tank. This helical fin provides added strength to the storage tank, rigidifying the tank and helping the tank to withstand stresses.

As noted, the procedures described above are applicable particularly to the construction of large diameter storage tanks. A typical size is 31 feet in diameter, with a circumference of about 98 feet. Sheet steel approximately ¼ inch thick and 4 feet in width may be employed, in coils of 60,000 to 70,000 pounds (i.e., 1500 to 1600 lineal feet of steel per coil). As a coil of steel is exhausted in the building of a tank, another coil is employed, with the end joined by welding to the previous coil. The movement of the steel in the fabrication of a tank may be at any convenient rate. With automatic welding, 5 feet to 10 feet per minute may be achieved. Hand welding may also be employed, in which case slower rates of strip feed may be used.

The co-pending application Ser. No. 656,252 incorporated herein by reference discloses procedures for completing tank bottom and top structures. Strip support and welding techniques are disclosed in that application, all of which may find use in the system of the present application.

The present invention thus provides a simple procedure of forming a substantially right-angled bend in a strip and joining, by welding, that bend with the unbent lower edge of a helical turn thereabove. The fin that is produced by the bending is not only useful in the strengthening of the tank but is also useful as a support structure by which the tank may be supported and driven during the building process. In particular, with reference again to FIG. 7, it will be noted that the drive assembly 43 utilizes driving rollers which act upon the fin 30c.

It will be apparent that modification may be made to the representative but presently preferred embodiment above. Accordingly, the invention should be taken to be defined by the following claims.

I claim:

1. In a method of producing a large diameter storage tank from strip metal, comprising feeding the strip metal to a support assembly arranged circularly on a base and which supports the strip vertically in a helical path, the improvement comprising bending only the upper edge of the strip fed to the support assembly into substantially a right-angled bend, aligning said bent upper edge with the unbent lower edge of the helical turn immediately thereabove, and welding together said two aligned edges.

2. A method according to claim 1, in which said right-angled bend is made toward the outside of said storage tank to produce an outwardly directed helical fin on said tank.

3. In apparatus for producing a large diameter storage tank from strip metal, comprising a support assembly arranged circularly on a base for supporting strip metal vertically in a helical path, means for feeding strip metal to said support assembly, the improvement comprising means for bending only the upper edge of the strip fed to the support assembly into substantially a right-angled bend, means for aligning said bent upper edge with the unbent lower edge of the helical turn immediately thereabove, and means for welding together said two aligned edges.

4. Apparatus according to claim 3, in which said bending means produces said right-angled bend extending toward the outside of said storage tank to produce an outwardly directed helical fin on said tank.

* * * * *